Figure 1:
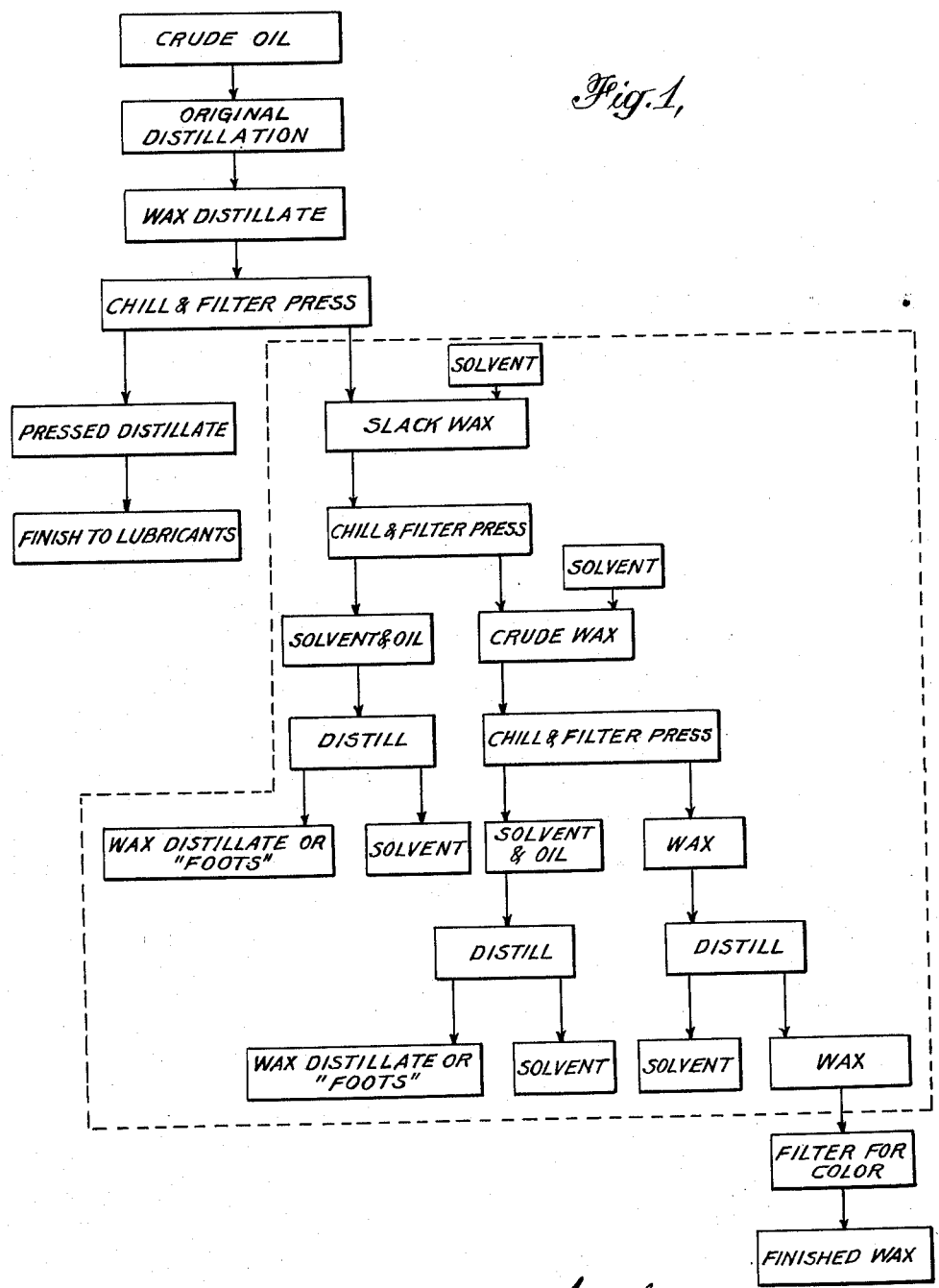

May 17, 1938.    T. S. RICHARDSON ET AL    2,117,984
METHOD OF REFINING WAX
Filed July 23, 1935    3 Sheets-Sheet 1

May 17, 1938. T. S. RICHARDSON ET AL 2,117,984
METHOD OF REFINING WAX
Filed July 23, 1935 3 Sheets-Sheet 2
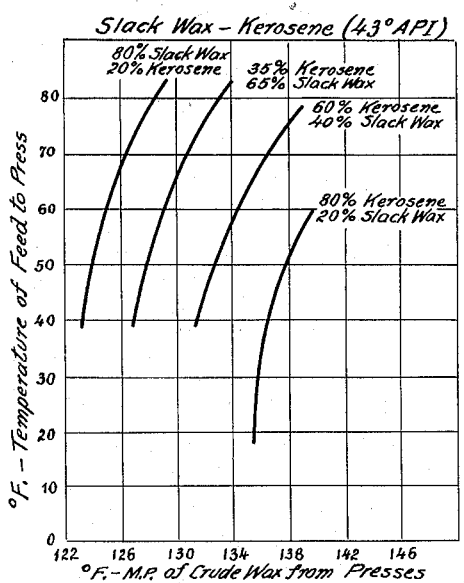
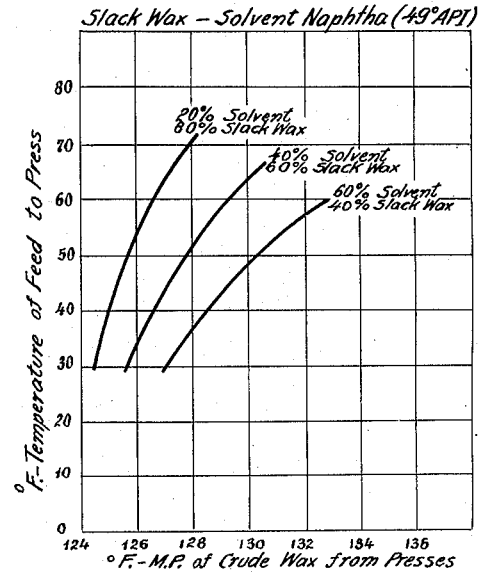
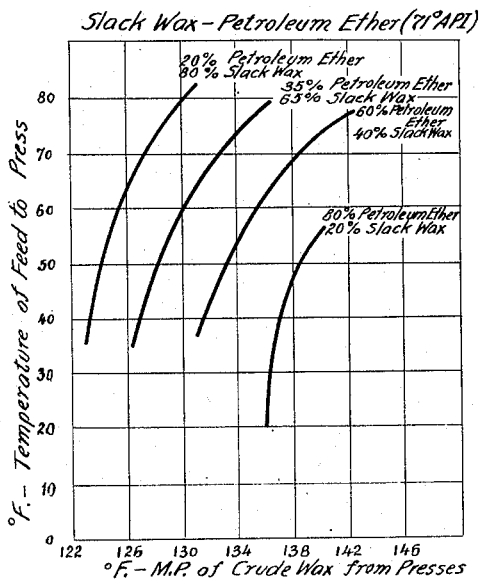
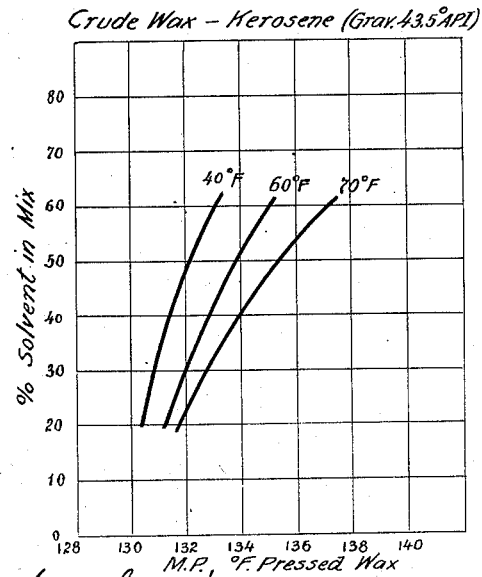
Thomas S. Richardson
Percy L. Smith INVENTORS
BY
Myron J. Hubbard
ATTORNEY May 17, 1938.  T. S. RICHARDSON ET AL  2,117,984
METHOD OF REFINING WAX
Filed July 23, 1935  3 Sheets-Sheet 3

Crude Wax-Solvent Naphtha (Grav. 48.8°API)

Crude Wax-Petroleum Ether (Grav. 72.4°API)

Thomas S. Richardson
Percy L. Smith
INVENTORS

BY
ATTORNEY

Patented May 17, 1938

2,117,984

UNITED STATES PATENT OFFICE 2,117,984

METHOD OF REFINING WAX

Thomas S. Richardson and Percy L. Smith, Beaumont, Tex., assignors to Socony-Vacuum Oil Company, Incorporated, New York, N. Y., a corporation of New York Application July 23, 1935, Serial No. 32,712

3 Claims. (Cl. 196—18)

This invention is directed to the recovery of refined wax of controlled melting point and of uniformly high tensile strength from mixtures of wax and oil in which wax is predominant, such as slack wax, wax filter wash bottoms, unsweatable slack wax, and the like.

Freedom from mechanically entrained oil and moisture is a highly desirable quality in finished refined wax. The degree of freedom from oil and moisture has formerly been determined by subjecting a weighed portion of wax in comminuted form to pressure between blotters or other adsorbent media and observing the change in weight. Waxes supposedly entirely free from oil and moisture as determined by this test have been found to still contain sufficient quantities of oil and moisture to render them low in quality or even unacceptable for use in many of the industrial uses to which wax is put. Quantities of oil and moisture which will not be detected by this means are yet sufficiently great to impart to the wax granular structure, to cause its surface to frequently have a mottled appearance, and to exude from the wax and give the surface a greasy feel and appearance. In the manufacture of candles the presence of these contaminants not only spoils the surface of the finished candle, but gives candles which are mechanically weak, which break easily and which tend to bend at high atmospheric temperatures, even though the wax used in their manufacture is of comparatively high melting point. In many uses where the wax is used in cake form, the presence of amounts of oil and moisture incapable of detection by this test, render the wax cake so weak that serious trouble is had with breakage of the cake. When the wax is used for impregnation purposes, such as in the waxing of paper and the like, these impurities give rise to a greasy feel of the waxed surface. Similarly when used to impregnate wrapping papers and the like, a very common objection to waxes of low tensile strength is that they will not permit of obtaining a permanent seal by the usual method of subjecting the folded package to momentary heat and pressure. When waxes containing similar amounts of oil and moisture are used, either as protective coating or as covering on jars in home canning, or to impregnate papers and/or other wrapping materials coming in contact with food, small amounts of these impurities frequently give rise to objectionable tastes and odors which may be transferred to the food product.

A recently developed test which is capable of determining the relative degree of freedom of wax from infinitesimal amounts of contaminants such as these is the tensile strength test. The tensile strength of wax is expressed as the result of the test in which an experimental bar of wax of known cross section is pulled apart by an ordinary type tensile strength testing machine very similar to that used in the determination of the tensile strength of paper and textile materials, the operation being carried out under controlled conditions of temperature, humidity, etc. The test is not yet sufficiently standardized for its meaning to be explored completely, but it is known that high tensile strength apparently is concurrent with low oil content of wax, and that for many industrial uses, a test of this nature is the only one which will indicate the presence of oil, moisture and/or low melting point waxes with sufficient accuracy to determine whether or not the wax is properly qualified for the intended use. The tensile strength is expressed usually as the pounds necessary to break a bar of wax ½-inch on a side or 0.25 square inch in area as determined by the average of a number of checking determinations made under controlled conditions at a temperature of 70° F. In making this test, about 300 cc. of wax is heated to its melting point, (about 130° F.) carefully heated to remove any water present, and then further heated to about 230° F. and poured into a mold to form a tensile test bar having a minimum cross-section of 0.25 square inch, with ends properly formed to be gripped by the machine in use. After cooling, the test bars are held at 70° F. for about two hours, followed by fifteen minutes in a 70° F. water bath and then tested. The test is conducted in an atmosphere held at 70° F. with humidity of 55%, (plus or minus 5%), at 70° F. The rate of pulling is ⅝" per minute. The tensile strength is expressed as the breaking pull necessary for the bar under test, i. e., pounds per 0.25 square inch area, as noted above. For purposes of illustration, it may be noted that the normal range of tensile strength of waxes produced by ordinary processes is from a low of 35 to a high of 70. That this test is very delicately responsive to oil may be shown by tests wherein a high tensile, high melting point wax was mixed with known quantities of oil and it was found that in the case of a 130/133 melting point wax of an original tensile strength of 60 pounds 0.015% of oil therein lowered the tensile strength to 50 pounds, while 0.3% of oil lowered the tensile strength to 18 pounds, in each case without causing sufficient change in the melting point to be determined by the method of test in use.

It has been found that the ordinary methods of processing wax now in use are frequently incapable of producing waxes sufficiently high in tensile strength to permit of their use for many industrial purposes. The method of removing oil and moisture from wax now in use is that of sweating. In this method a cake of unrefined wax is formed above a metallic screen, which screen is placed in a pan. The method of operation is usually that of filling the pan with warm water to a level just above the screen, running the melted wax in on top of the water, allowing it to solidify and then removing the water to allow the wax cake to rest on the screen. After this, the temperature of the wax is raised, usually by heating the entire room in which the apparatus is placed, allowing the wax to soften so that oil, moisture, and low melting point waxes may escape from the wax cake into the space below the supporting screen and be drawn off. The melting point of the wax being produced is governed by the temperature of sweating. Slack wax partially purified by sweating is designated crude wax and crude wax is usually submitted to one or more sweating operations to arrive at a finished wax of high melting point. Operations of this type result in a necessity for carrying out numerous sweating operations for various grades of wax, several sweating operations commonly being found necessary for the attainment of each desired grade. In each sweating operation, there is produced a wax containing "foots" oil, which must be collected, rechilled, repressed and the wax combined with other batches of wax and resweated, since it frequently contains considerable percentages of high melting point wax. The operation is time consuming, since several days are normally required for completion of a single sweating operation, and the equipment and housing required is complicated and costly. The process is inefficient for the intended purpose, inasmuch as the over-all goal is reached by a completion of multitudinous individual operations. More important, this process is inefficient because of its inability to make other than a very poor fractionation or separation of the waxes of different melting points. The operation is frequently low in yield of finished wax of high melting point, good wax being discarded in difficultly recoverable form in foots oils. It requires a very considerable amount of attention to the distilling and other preparation of the original wax distillate, since in many cases, it is quite possible to get a pressable distillate which will not yield a sweatable wax. These methods of recovery are incapable of recovering waxes from various wax mixtures, such as wax filter wash bottoms, unsweatable slack wax and the like. It is now known that it is incapable of a sufficiently careful control to insure the regular production of wax desirably free from mechanically entrained oil and moisture as indicated by the tensile strength test.

The melting point of wax herein referred to is the A. S. T. M. Standard Method of Test for Melting Point of Paraffin Wax (D87–22, 1933 A. S. T. M. Standards, Part II, page 836). This method involves cooling a sample of melted wax under specified conditions and noting the temperature at which a minimum rate of temperature change occurs, indicating this temperature as the melting point.

The object of this invention is to devise a method of finishing mixtures of paraffin wax and oil to a high yield of finished waxes of controlled melting point and high tensile strength. An object is to develop a process which will permit the obtaining of higher yields of high melting point wax than those heretofore found conveniently possible. A further object is to facilitate the handling of those waxes which ordinarily may be found to be pressable but not sweatable. A further object is the provision of a process whereby wax of desirable quality may be recovered from wax-bearing substances heretofore incapable of treating by the methods now in use.

We have discovered these various objects may be accomplished by a process which may be very briefly described as one of mixing melted paraffin wax with a hydrocarbon solvent, chilling the solution to crystallize wax therefrom, and separating the wax from the solvent and oil in a high pressure filter press operated at controlled temperatures determined by the percentage of solvent, the nature of the solvent and the desired melting point of the final wax. We have further discovered that the process of this invention when applied to wax distillate of ordinary qualities may frequently give much higher yields than the ordinary process of sweating. We have discovered that the process of this invention may be applied to the wax from any wax distillate which can be pressed, whether the slack as produced by such pressing is sweatable in the ordinary equipment or not, and that treatment of this normally unsweatable wax in accordance with our discovery, will give yields of high melting point wax of a high tensile strength quite commensurate with those from the same distillate by the same method when properly prepared to give a wax which is both pressable and sweatable. We have also discovered that the process of this invention may be used for the recovery of good grades of wax of high tensile strength from wax-containing mixtures not capable of being processed by ordinary methods.

Figure 6:
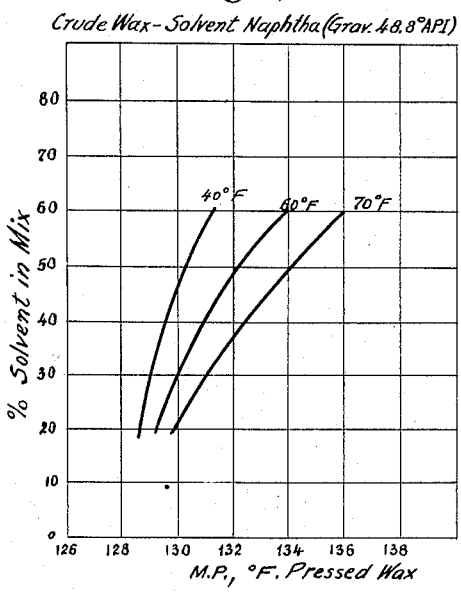
Figure 7:
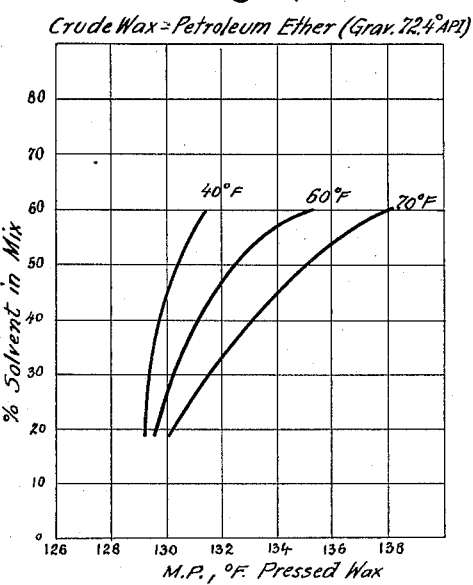
Figure 8:
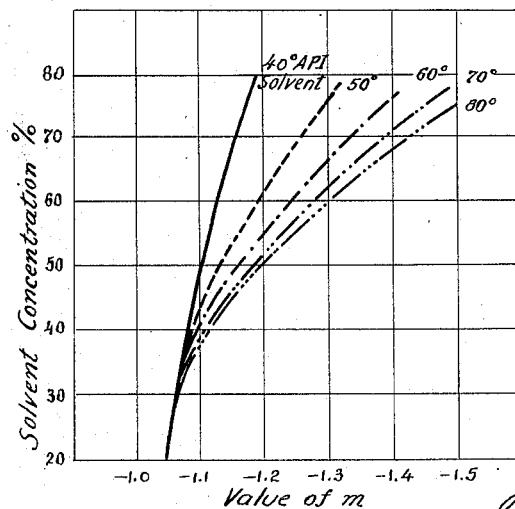

In order that the process herein disclosed may be more completely understood, reference is now made to the drawings attached to and made a part of this specification. In these drawings, Figure 1 shows a systematic diagram of the general refining process herein described, as it relates to the handling of wax distillate and wax. Figures 2, 3 and 4 present data showing the relations of pressing temperatures, concentration of solvent, and kind of solvent to the pressing of slack wax for crude wax having definite melting point. Figures 5, 6 and 7 set forth similar data for the pressing of crude wax to finished wax of definite melting point. Figure 8 is shown to define certain relationships of operative conditions.

Referring now to Figure 1, we see that the general process starts with the separation of wax distillate from the crude by the original distillation operation. This wax distillate is chilled and filter pressed in accordance with known art to yield a pressed distillate which may be finished to lubricants in known manner, and a slack wax. This slack wax forms the starting material for the process herein disclosed, which is set apart upon the diagram of Figure 1, by the area within the dotted lines. The slack wax produced from wax distillate pressing is melted and mixed in a known amount of a solvent hydrocarbon of desired character, and the mixture of wax and solvent is chilled to a predetermined temperature, and subjected to filter pressing to separate the wax from a mixture of the solvent and oil.

This solvent and oil mixture is distilled in a known manner to recover solvent and to produce a foots oil which may be recombined with the original wax distillate or separately handled in a manner similar to that wax distillate, and solvent, which may be returned to the process. The crude wax resulting from the first solvent pressing of slack wax is melted and mixed with a further amount of hydrocarbon solvent of a desired character. This mixture of crude wax and solvent is chilled to a predetermined temperature, which is determined by the melting point to be desired in the final wax product and subjected to filter pressing to separate a finished wax from the solvent and oil. This finished wax is then subjected to distillation with steam in order to remove any remaining traces of solvent, and to free the wax of odor. After the wax has been steamed in the still to a desired degree, it is removed and filtered while hot through a bed of clay or other decolorizing material in known manner to produce the finished wax of commerce.

As a typical example of operations under this disclosure, we may describe the refining of a slack wax. This wax as presented to the process herein disclosed, had the following properties:

| | | |
|---|---|---|
| Melting point | °F | 115.5 |
| Oil and moisture | % | 23.8 |

In handling this slack wax a naphtha solvent of the following characteristics was used:

| | | |
|---|---|---|
| Gravity | °A.P.I. | 48.5 |
| Flash (Tag. closed cup) | °F | 115 |
| Color (Saybolt) | | 26 |
| Initial boiling point | °F | 325 |
| Dry point | do | 400 |

The slack wax was melted and heated to a temperature of 125° F. and pumped into a tank containing the naphtha until the two ingredients were present in the proportions of 41% of naphtha and 59% slack wax, after which the tank was agitated with open steam to insure thorough mixing, then allowed to settle and moisture withdrawn. This solution was chilled to a temperature of 48° F. by passing through chillers wherein it was cooled by the direct expansion of ammonia in the manner well known in the art, and was pumped to the filter presses, reaching the presses at a temperature of 50° F. The filter press was of the type of the ordinary plate and frame press used in the pressing of wax distillate, and the chilled mixture was discharged thereinto and allowed to build up cake and filter therein in the ordinary manner until a pressure of 400 pounds per square inch was reached, this step occupying about seven hours, and pressure maintained for about one hour, after which the press was cut off and dumped in the usual manner. This operation yielded as crude wax 72.03% of the slack wax originally charged. (This yield may be compared with the yield of approximately 45% customarily obtained by sweating this same slack wax in the usual manner.) The tests on this crude wax so formed were as follows:

| | | |
|---|---|---|
| Melting point | °F | 125.6 |
| Oil and moisture | % | .67 |

The foots oil produced from this operation after freeing from solvent amounted to 25.97% of the slack wax originally charged, indicating an over all loss for this operation amounting to 2% of the slack wax originally charged. In ordinary commercial operation, the loss is much less than the figure encountered in this exemplary operation. As an evidence of the small percentage of high melting point wax remaining in this foots oil, its cold test was 86° F., which is below that of foots oil ordinarily obtained by the sweating of slack wax.

The crude wax yielded from the first operation was again melted and mixed with naphtha of the same character as before to form a mixture having 38% of crude wax and 62% of naphtha. This solution was chilled in the same manner to 56° F. and pumped to the filter presses at a temperature of 58° F. Similar presses were used, and the pressure was again built up to 400 pounds per square inch and maintained there for approximately one hour, in the same manner as before, after which the press was cut off and dumped.

The finished 130/133 melting point wax yielded by this operation was 67.5% of the crude wax charged to the operation. (This yield may be compared to the 45% commonly experienced when commercially sweating crude wax of this character.) The over-all yield of about 45% of 130/133 melting point wax on slack wax initially charged into process may be directly compared with the 18–20% which may ordinarily be obtained by the same number of corresponding steps when the same slack wax is sweated in the customary manner commercially practiced. This wax was then steam stilled to remove about 8.5% of naphtha remaining in the finished crude wax, and to free the wax from objectionable odor. The finished product had the following properties:

| | | |
|---|---|---|
| Melting point | °F | 133.6 |
| Tensile strength | pounds | 83 |
| Oil and moisture | | Negligible |

It may be seen that this finished wax is not only an unusually good product in that it is of a desirably high tensile strength, much above the normal range of sweated waxes, which is from about 35 to 70, but that it is entirely free from oil and moisture which may be detected by any means of test less sensitive than the tensile strength test. Additionally and of paramount importance is the fact that the yield of a wax of this character obtained by two operative steps is more than twice that which is commonly obtained by the corresponding two operative steps of the sweating process at present commercially practiced.

As a further example of the efficacy of this process, we may describe the pressing of a material known as "wax clay wash bottoms." This material is obtained by washing the percolation filters, (which are used to bring finished wax to final color), with a solvent, and then distilling off the solvent to leave this poor grade of wax, which is normally not finished to wax, because current operating processes find it practically impossible to produce a satisfactory wax from this grade of stock. The wax charged in this example had the following characteristics:

| | | |
|---|---|---|
| Melting point | °F | 130 |
| Tensile strength | | 35 |

For treating this wax, we made use of a naphtha solvent of the following characteristics:

| | | |
|---|---|---|
| Gravity | °A.P.I. | 46.3 |
| Flash (Tag. closed cup) | °F | 121 |
| Color (Saybolt) | | 30 |
| Initial boiling point | °F | 331 |
| Dry point | °F | 403 |

The wax was melted, heated to a temperature of 150° F. and pumped into a tank containing the naphtha, which previously had been heated to 135° F., until a concentration of 40% wax and 60% naphtha had been reached. The mixture was agitated with open steam, allowed to settle, and freed of moisture. This mixture was then chilled in the manner previously described, and pumped to the presses, entering the press at a temperature of 50° F. The pressure in the filter press was allowed to build up to 400 pounds per square inch, and maintained at this level for about three hours, after which the press was cut off and dumped. The wax derived from this pressing operation, after being steam stilled in the usual manner to remove naphtha and produce a satisfactory odor, was found to be 57.3% of the wax originally charged, the characteristics of this wax being as follows:

Melting point_____° F__ 134.9
Tensile strength_____pounds__ 85
Oil and moisture_____ None It will thus be noted that nearly 60% of a material which cannot be treated by the processes customarily in use, has been recovered by this process, and that the 60% so recovered is a wax of unusually desirable characteristics, fully equal to those obtained when working with preferred raw materials.

We have found the process herein disclosed may be used upon any wax which may be originally separated from the wax distillate in which it occurs by a pressing operation. In this one characteristic alone, as well as in others, the process herein disclosed is more efficient than sweating, since many slack waxes as originally produced from wax distillate do not possess sufficient strength to stay in position while sweating, and sweating is consequently impossible. Similarly, it may be applied to such products as the wax clay wash bottoms above described, which ordinarily cannot be treated by the current method.

The solvents which may be used in the operations herein disclosed, have a wide range of characteristics. Desirable results may be had with all of the light hydrocarbons, ranging from heavy kerosene to very light naphthas, or across a range of gravity of from about 40° A. P. I. to about 80° A. P. I., and if proper pressure equipment be provided, liquid butane and similar substances can be used. In commercial practice, however, we prefer to use a solvent naphtha of the characteristics above described, having a boiling range from an initial of about 300° F. to an end point of about 400° F., since this naphtha is sufficiently non-volatile and high flash to effectively reduce evaporation losses and fire hazard, and sufficiently low in final boiling point to enable ready separation from foots oil and from wax by simple distillation processes. It has been indicated that the character of the solvent, whether it be petroleum ether, solvent naphtha, or the relatively heavy kerosene, does not appreciably influence either the yield of wax of a given melting point, or the odor of the wax.

The percentages of solvent which can be used in the mixture of wax and solvent, can be varied from about 20 to about 85%, depending upon the type of solvent, and on the type of wax which is to be pressed. In using our preferred solvent naphtha, we prefer to use a concentration of 60% of solvent when pressing crude wax, and 40% of solvent in the mixture when pressing slack wax. Similarly, desirable results can be obtained with higher percentages of solvent, although in this case the process assumes an economic load, due to the cost of chilling the excess solvent. It has been noted that with very large quantities of solvent, regardless of temperature, the tendency is toward the formation of smaller crystals. With equipment capable of handling relatively stiffer mixtures at higher pressures, the percentage of solvent may be decreased.

The controlling temperature of the operation is the temperature of the mixture as fed to the press, as the melting point of the final product depends upon this temperature, and its relation to the concentration of solvent, and kind of solvent used. These temperatures may ordinarily vary from about 20° F. to about 90° F. When pressing a slack wax mixture containing 40% of our preferred solvent, we prefer to feed the presses with a mixture which has a temperature of the order of 50 to 55°. When pressing a mixture of crude wax, which contains 60% of our preferred solvent, we prefer to deliver to the presses a mixture which has a temperature of 55 to 60°. The lower the temperature at this point, the greater will be the amount of wax separated, since the separated wax will contain a greater proportion of lower melting point waxes. At low temperatures, with low concentrations of solvent, separation becomes difficult because of the extreme thickness of the mixture. The upper limit of temperature may range as high as temperatures approximating the melting point of the mixture of the naphtha and wax, in which case small yields of extremely high melting point waxes may be recovered. For ordinary operation, to yield the waxes usually sold to the trade, temperatures ranging upward of 80° F. with proper concentrations of proper solvent may be used to give waxes capable of meeting, or even bettering, the usual high bracket of 130/133 melting point waxes. If waxes having melting points in the neighborhood of 140° are desired, slightly increased temperatures may be used to secure them.

The rate at which the mixture of solvent and wax can be chilled before filter pressing, may be widely varied without affecting the process. In other processes control of this feature must be had, since the rate of chilling exerts a considerable influence upon the size of crystal formed, and the success of subsequent operation practices as ordinarily carried out at the present time is dependent upon the size and structural strength of the crystal. For example: In the sweating process customarily used, the chilling must be of such a nature that the crystals formed present a network, which is sufficiently strong to maintain its physical character at temperatures near its melting point (and the original wax distillate be capable of forming such crystals), and yet which is possessed of a sufficient number of interstitial spaces to enable the draining of oil and low melting point wax therefrom.

The inter-relation of the type of solvent, percentage of solvent and temperature of pressing to the melting point of the pressed product, may be clearly understood by referring to Figures 2 to 7 inclusive. Figures 2 to 4 are similar, and relate to the first solvent pressing step, namely that of pressing slack wax to obtain crude wax. In these figures, the vertical coordinate shows the temperature of mixture of solvent and wax as fed to the filter press in degrees Fahrenheit. The horizontal coordinate shows the melting point of the wax product from the pressing operation. The several curves upon each figure show the relation between press feed temperature and melting point for each of the several concentrations shown of solvent and wax. In this group, Figure 2 shows the relations to be expected when the solvent used is kerosene of approximately 43° A. P. I. gravity. Figure 3, shows the conditions encountered when the solvent used is the preferred solvent naphtha described of an A. P. I. gravity of about 49°. Figure 4 shows the conditions which may be expected when the solvent used is the light hydrocarbon type frequently spoken of as petroleum ether, having an A. P. I. gravity of about 71°.

As a general discussion of the characteristics of the process as set forth in the above graphical data, it may be noted that it is logical to expect that the conditions set forth in Figures 2, 3, and 4, having to do with the first solvent pressing of slack wax may be found to vary over a moderately wide range, since the wax recovered from the wax distillate in the pressing of that product, may vary somewhat in quality and in characteristics, depending upon crude source, type of distillation practice, and similar process variables.

Figures 5, 6 and 7 are similar in disclosure, but slightly different in set-up in that the vertical coordinate shows the percentage of solvent in the mixture of solvent and wax, the horizontal coordinate shows the melting point of the finished wax and the several curves on each figure show the results which may be expected when the operation is carried out at certain designated temperatures. These figures show the characteristics which may be expected of the second pressing operation, wherein a crude wax is melted, mixed with solvent and pressed to give a final wax. In these figures, Figure 5 shows the conditions which may be expected when the solvent is a kerosene of approximately 43° A. P. I. gravity. Figure 6 shows the conditions when the solvent is the above-mentioned preferred naphtha solvent of approximately 49° A. P. I. gravity. Figure 7 shows the results which may be expected when the solvent is a petroleum ether of approximately 72° A. P. I. gravity. The data set forth in Figures 5, 6, and 7 will not be subject to variation to so great an extent as that of Figures 2, 3, and 4, since the preceding step of solvent pressing of slack wax will, if properly carried out, give crude waxes generally similar in characteristics. That is to say, the first solvent pressing will tend to correct and eliminate the differences in the crude wax, which might arise from its original source and previous history.

The second step of this process, namely that indicated in Figures 5, 6, and 7 is necessary for the attainment of the desirable high tensile strengths which this process is capable of making. The product of the first step may be sufficiently free from oil and moisture to show no indication in the method of test heretofore used. It is not, however, sufficiently free of oil and moisture for many of the industrial uses to which it may be put. This may be noted from one of the examples herein given, where the wax resulting from the first solvent pressing operation was found to have an oil and moisture content of .67%. The application of this second step of pressing of wax from a solvent enables the attainment of tensile strengths usually in excess of 70 pounds per 0.25 square inch, at 70° F., which level is normally incapable of being regularly attained in commercial operation by the processes of sweating now in use.

The conditions of the second step of solvent pressing are apparently capable of fairly accurate mathematical prediction, since we have found that the relation of pressing temperature and melting point to be expected in the finished wax may be expressed with an accuracy sufficient for the control of commercial operations by the following equation, wherein M. P. designates the melting point, P. T. designates the temperature of pressing, and $m$ is a constant which varies with the concentration of solvent in the mixture of solvent and wax, and with the gravity, ° A. P. I., of the solvent used:

$$MP - 108.7 = PT\left(\frac{1+m}{m}\right) - \frac{18}{m}$$

Figure 8 shows the manner of variation of this constant $m$. In this figure the vertical coordinates are the concentration of solvent in the mixture of solvent and wax, as 20 in a mixture containing 20% of solvent and 80% of wax by volume. The horizontal coodinate shows the value of the constant $m$ and the various curves show how this constant $m$ varies in respect to concentration with solvents of various gravities as designated on the respective curves. It should be noted that the above equation may be applied conveniently by way of trial calculations from trial press temperatures assumed from consideration of Figs. 2 to 7 inclusive.

In the claims where a numerical expression for the tensile strength of wax is given, that expression is intended to designate the pounds necessary to break a bar of wax having a cross sectional area of 0.25 square inch, when subjected to tests at a temperature of 70° F. under conditions of test specified hereinbefore.

In the following claims, the term "oil bearing wax mixtures" is intended to indicate not only sweatable slack wax, but to include unsweatable slack wax, wax filter wash bottoms, and in general any similar product predominantly composed of wax capable of being recovered in crystalline form and containing a minor proportion of oil, moisture and the like.

We claim:

1. A process for producing a refined paraffin wax product of predetermined melting point and of uniformly high tensile strength containing only traces of oil from an oily wax mixture of high melting point wax and low melting point wax containing a predominant amount of wax which has been previously obtained by a de-oiling treatment of an oily wax mixture containing a predominant amount of wax comprising selecting a particular petroleum hydrocarbon solvent having a gravity between about 40° A. P. I. and about 80° A. P. I., selecting a particular amount of said solvent, between about one-fifth part and about four parts, adding the selected amount of the selected solvent to said oily wax mixture and dissolving the mixture therein, selecting a particular melting point for the refined wax product, cooling the wax-solvent solution to a temperature not substantially different from that of the press temperature as hereinafter determined until wax of the selected melting point crystallizes therefrom, and recovering the crystallized wax by a filtration process carried out at a temperature not substantially different from that required to give approximately the selected melting point by the following equation:

$$MP - 108.7 = PT\frac{(1+m)}{m} - \frac{18}{m}$$

wherein MP represents the particular melting point selected for the refined product, PT represents the press or filtration temperature, and $m$ represents a constant which is given in the graph of Fig. 8 of the drawings as the abscissa of the curve of the particularly selected solvent at the point where the ordinate is the particularly selected amount of the selected solvent added to the oily wax mixture.

2. A process for producing a refined paraffin wax of predetermined melting point and of uniformly high tensile strength containing only traces of oil from an oily slack wax product containing a predominant amount of wax which comprises selecting a particular petroleum hydrocarbon solvent having a gravity between about 40° A. P. I. and about 80° A. P. I., selecting a particular amount of said solvent between about one-fifth part and about four parts, adding the selected amount of the selected solvent to the slack wax product and dissolving the slack wax therein, selecting a desired melting point for the crude wax to be produced from the slack wax, cooling the wax-solvent solution to a temperature not substantially different from that of the press temperature as hereinafter determined until wax of the selected melting point crystallizes therefrom, recovering the crystallized wax to obtain the crude wax by a filtration process carried out at a temperature not substantially different from that required to give approximately the selected melting point by the following equation:

$$MP - 108.7 = PT\frac{(1+m)}{m} - \frac{18}{m}$$

wherein MP represents the particular melting point selected for the crude wax, PT represents the press or filtration temperature, and $m$ represents a constant which is given in the graph of Fig. 8 in the drawings as the abscissa of the curve of the particularly selected solvent at the point where the ordinate is the particularly selected amount of the selected solvent added to the slack wax, and then subjecting the crude wax so produced to the same treatment as outlined above for the slack wax whereby the desired refined wax is obtained.

3. Process according to claim 2 for preparing a paraffin wax of 130–3° F. melting point in which the hydrocarbon solvent used has a gravity of about 45° A. P. I. and the amount of solvent used in treating the slack wax is about 40% and the filtration temperature is about 50° to 55° F. and the amount of solvent used for treating the crude wax is about 60% and the filtration temperature is about 55° F. to about 60° F.

THOMAS S. RICHARDSON.
PERCY L. SMITH.